US008756780B2

(12) United States Patent
Maunder (10) Patent No.: US 8,756,780 B2
(45) Date of Patent: Jun. 24, 2014

(54) TUBE APPLICATOR

(75) Inventor: Roy Peter Maunder, Lovedean (GB)

(73) Assignee: BioPure Technology Limited, Horndean, Hampshire (GB)

( * ) Notice: Subject to any disclaimer, the term of this patent is extended or adjusted under 35 U.S.C. 154(b) by 432 days.

(21) Appl. No.: 13/012,544

(22) Filed: Jan. 24, 2011

(65) Prior Publication Data

US 2011/0179617 A1   Jul. 28, 2011

(30) Foreign Application Priority Data

Jan. 22, 2010   (GB) .................................. 1001100.5

(51) Int. Cl.
*B25B 27/14* (2006.01)
*B23P 19/02* (2006.01)
*B23P 19/04* (2006.01)
*B23P 19/00* (2006.01)

(52) U.S. Cl.
CPC ................. *B23P 19/00* (2013.01); *B23P 19/02* (2013.01); *B23P 19/04* (2013.01)
USPC .................. 29/280; 29/525; 29/282

(58) Field of Classification Search
CPC ......... B23P 19/00; B23P 19/02; B21D 39/00; B23Q 3/00
USPC .............. 29/237, 238, 243.53, 243.56, 243.5, 29/272, 280, 525
See application file for complete search history.

(56) References Cited

U.S. PATENT DOCUMENTS

| 4,945,621 A | 8/1990 | Sugiyama |
| 5,163,215 A * | 11/1992 | Ledford, Jr. .................... 29/468 |
| 5,704,106 A * | 1/1998 | Sampson et al. ................ 29/450 |
| 6,981,720 B2 * | 1/2006 | White et al. ............... 285/332.1 |
| 7,322,085 B1 | 1/2008 | Benson |
| 2007/0209204 A1 | 9/2007 | Chase |
| 2013/0086791 A1 * | 4/2013 | Maunder ........................ 29/525 |

FOREIGN PATENT DOCUMENTS

| EP | 0243673 A2 | 11/1987 |
| FR | 2692291 A1 | 12/1993 |
| GB | 465451 A | 5/1937 |

* cited by examiner

*Primary Examiner* — Lee D Wilson
*Assistant Examiner* — Seahee Yoon
(74) *Attorney, Agent, or Firm* — Lambert & Associates; Gary E. Lambert; David J. Connaughton, Jr.

(57) ABSTRACT

Apparatus to connect a flexible tube to a spigot on bio-disposable systems. The apparatus comprises a support for a spigot and jaws for gripping and holding a flexible tube. The jaws open and close for insertion of the flexible tube either under manual or pneumatic force. The jaws also include a front section that is openable against a resistance. In use, the end of the spigot is place inside the end of the flexible tube, the spigot is then positioned on the support, and the tube clamped into the jaws. Either on manual or pneumatic action, the spigot is advanced into the flexible tube within the jaws. The front section of the jaw opening slightly to accommodate the spigot, while the back section of the jaw holds the tube firmly in position.

11 Claims, 6 Drawing Sheets

TUBE APPLICATOR

BACKGROUND OF THE INVENTION

1. Field of the Invention

The present invention relates to apparatus for connecting a flexible tube to a spigot, barb, or the like.

2. Description of Related Art

In the food, medical and pharmaceutical industries single use apparatus, or bio-disposable systems, can be used in the preparation of batches of product. Such single use apparatus includes flexible tubing, typically made from silicone, but may be made from other plastics materials, such as thermoplastics. Connections to other pieces of apparatus are commonly made with flanged connectors clamped to each other. The connectors have hollow spigots to which a tube is connected in a fluid tight manner. Connections to other pieces of apparatus can also made using hollow spigots. These spigots are generally provided with barbed ends to retain the tubes.

It is important that this connection between the flexible tube and hollow spigot is fluid tight as fluid leaking between this connection would be lost to the process and when using valuable fluids any loss can be significant. It is particularly important that the connection is stable for the lifetime of the apparatus, because if the connection were to fail, the whole batch may be lost. To prevent disconnection and leaks, the connection is very tight, with the profile of the barb extending slightly beyond the normal diameter of the tube causing slight stretching of the tube around the barb, and therefore making disconnection of the tube from the spigot unlikely to occur. However, this of course makes connecting the tube to the spigot also difficult.

To aid connection, a lubricant, such as alcohol or oil, can be used. However, this can ease both the connection between the tube and the spigot and the disconnection. In addition, the lubricant can seep into the apparatus and contaminate the reaction chemicals and solvents, and the products. Thus it is preferable to avoid the use of such lubricants.

Apparatus has been developed to insert a spigot into a flexible tube, however, these typically incorporate the use of fingers inside the flexible tube to pull the tube open so the spigot can be inserted. While this certainly aids insertion of the spigot into the tube, the use of fingers adds potential contamination into the apparatus and risks damage to both the tube and the spigot. In addition, various types of plastic tubing, in particular thermoplastic tubing, does not return fully to shape once stretched. Thus the use of this type of apparatus to pull the tube open can lead to a permanently enlarged tube and thus a poor connection.

SUMMARY OF THE INVENTION

The object of the present invention is to provide improved apparatus for inserting a spigot into a flexible tube.

According to the invention there is provided apparatus for inserting a spigot into a flexible tube, the apparatus including
  means for supporting and advancing a spigot and
  means for gripping a flexible tube, while the spigot is inserted therein,
    the gripping means including a pair of jaws for gripping and releasing the tube, with sufficient strength to hold the tube but not crush the same,
    at least part of one or both jaws being moveably mounted against a resistance such that under the force of the advancing spigot at least part of one of both jaws can release sufficiently to allow the spigot to pass into the tube, while retaining the tube in the apparatus.

Preferably the jaws are tapered at their front edges to ease insertion of the spigot. Typically the jaws are provided with fine grooves or ridges to aid grip on the flexible tube. Preferably the jaws are contoured in accordance with the shape of the spigot.

To position and remove a tube, the jaws will preferably be mounted on runners. A cam rotated by a lever may be provided to move the jaws along the runners to open and close the same. In addition, in the absence of cam movement at least part of the jaws are mounted again spring force, enabling them to be moved against the spring to open and close under the force of the advancing spigot.

Advantageously, a front section of the jaws, typically a tapered section, may moveable against a resistance, with a back section of the jaws, generally not tapered, holding the tube in a fixed position while the jaws are closed.

The movement of the jaws, both for positioning to hold the flexible tube, and against a resistance can be provided manually, mechanically, electrically or pneumatically, the device being operated manually or electronically.

Typically the whole apparatus will be sterilizable, generally in an autoclave.

Advantageously the jaws can be removable to enable jaws contoured for different shapes of spigot to be easily inserted. In addition, it is possible to adjust the stroke of the supporting means.

BRIEF DESCRIPTION OF THE DRAWINGS

To help understanding of the invention, a specific embodiment thereof will now be described by way of example and with reference to the accompanying drawings, in which.

DETAILED DESCRIPTION

Referring to FIGS. 1 to 5, the apparatus 1 includes a base 2 on which is mounted a support 4 for a connector C having a spigot S. The spigot, as shown, has a barbed end B. While barbed end spigots are the most commonly used, the device could be used with a spigot with a parallel end. As shown this connector may be a flanged connector but may also be a T-connector, a Y-connector, adaptors, or any other type of device to which a flexible tube is connected over a spigot, including filters and the like.

Figure 1:
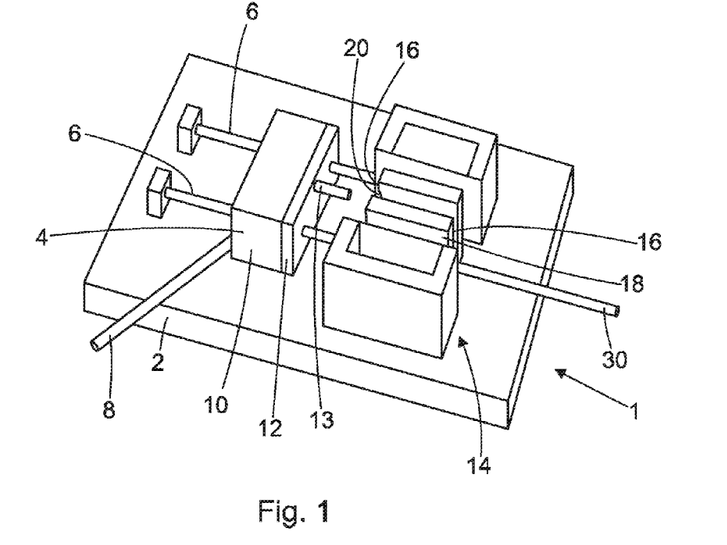
FIG. 1 is a perspective view of a tube applicator according to the invention.

The support 4 is mounted on a pair of runners 6 to allow it to be advanced forward and retreated backwards along the base 2. Advancement and retraction is achieved by means of a lever 8, although any other type of mechanical, electrical or pneumatic system could be used. The support 4 includes a block 10, mounted on runners to be moved by lever action, and an attachment 12, removably connected to the block, designed to support the chosen connector. As shown the attachment 12 is for a flanged connector C, and comprises a rod 13 onto which the flanged connector is placed, the flange being supported against the support 4. However, other attachments can be used to support different connectors. The attachment 12 also allows for variations in the size of the connector to still be connected to the flexible tube. The movement along the runners can be set to adjust the stroke of the forward motion of the support, which will depend upon the shape and length of the spigot.

Figure 2:
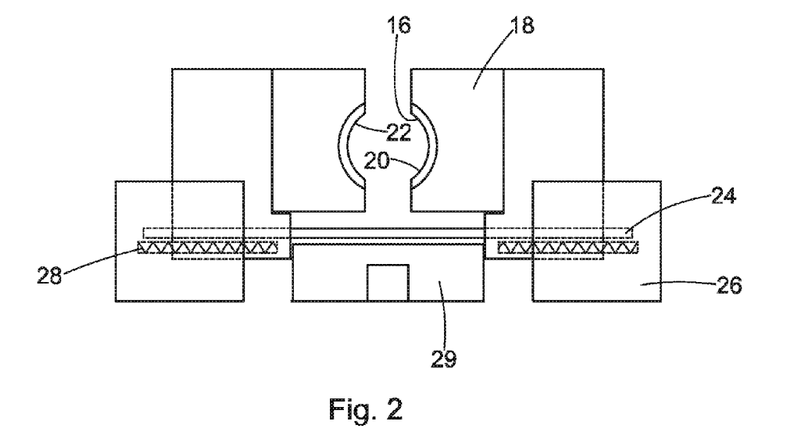
FIG. 2 is a front view of the jaws of the tube applicator of FIG. 1.
Figure 3:
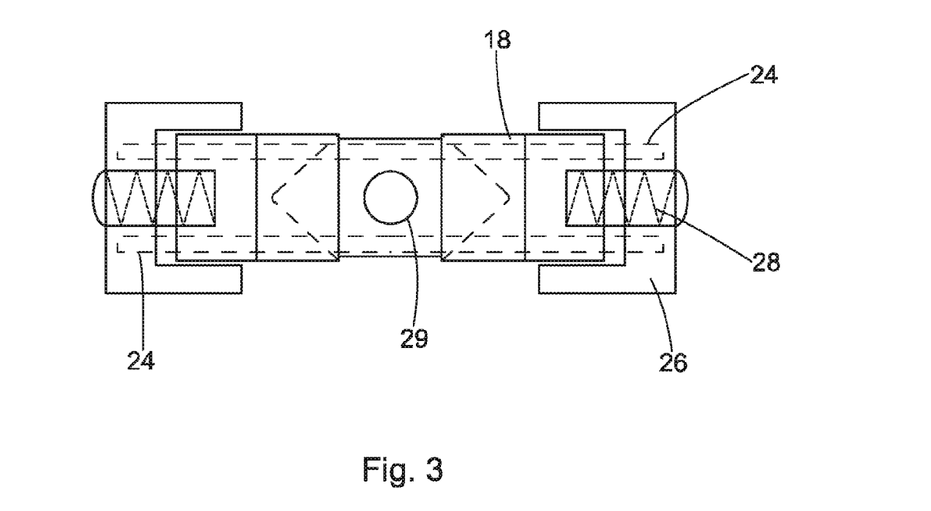
FIG. 3 is a top view of the jaws of the tube applicator of FIG. 1.

In addition, the base also carries a grip 14 for the flexible tube T. The grip 14 includes a pair of jaws 16. These are supported on a pair of carriers 18 and the jaws 16 can be changed in accordance with the diameter of the tube and/or the size and profile of the spigot to be inserted. When positioned on the carriers 18, the jaws 16 face the support 4 and attachment 12, and are aligned such that a tube held in the jaws 16 will be directly facing the spigot S of a flanged connector C held on the attachment 12.

The jaws 16 are slightly flared 20 at the end facing the attachment 12, and are provided with a series of grooves 22 to enhance the grip to the flexible tube. While the jaws are shown with grooves, ridges other forms of texture could additionally or alternatively be provided. In addition, the jaws are also contoured in accordance with the shape of the spigot, and in particular the shape and diameter of the barb on the spigot. While a generally flared pair of jaws will be satisfactory for a wide range of shapes of barbed spigot, in the preferred embodiment, the jaws are contoured in accordance with the specific contour of the barb to be inserted into the tube.

The carriers 18 are held on a pair of runners 24, secured to side supports 26, mounted on the base 2. Between the carriers 18 and the supports 26 are provided a pair of springs 28. These act to urge the carriers 18 into position on the runners. The carriers are also acted on by a cam 29 secured to the based underneath the runners. The cam 29 is rotated using a lever 30, and the shape of the cam 29 moves the carriers 18 between an open position, at which the flexible tube T can be inserted between the jaws, and removed, and a closed position in which the flexible tube is griped between the jaws. The jaws 16 grip the flexible tube T will sufficient force to hold it in position, but not crush it. However, on insertion of the spigot S into the flexible tube T, the jaws are able to move against the action of the springs, forcing them to open slightly to accommodate the barbed end section, while still maintaining a holding force on the tube.

The design of the jaws maintaining a holding force of the tube, while allowing expansion of the tube to accommodate the spigot as it is inserted therein, enables the apparatus to be effective. Where a barbed spigot is used, a slight expansion of the tube is required to accommodate this, which would not be possible with fixed jaws. Thus the resistive element in the jaws enables the expansion of the tube under force from the incoming barbed spigot, while still maintaining a holding force on the jaws. It is the design of the jaws to hold the flexible tube but to move sufficiently under force of the insertion of the spigot, which allows the apparatus to function.

Figure 4:
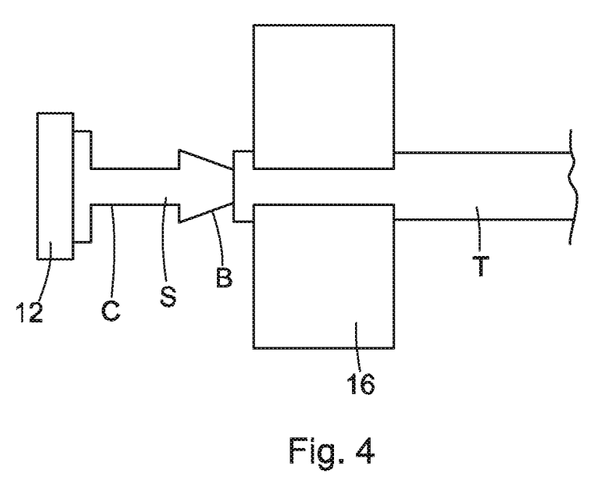
FIG. 4 is a top view of a spigot being connected to a tube using the applicator of FIG. 1.
Figure 5:
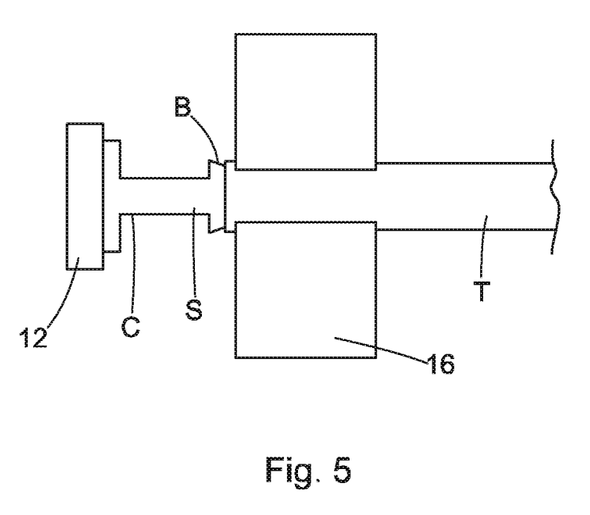
FIG. 5 is a top view of the connection of FIG. 4 at a more advanced stage.

Referring now to FIGS. 4 and 5, in use a connector C having a spigot S is placed on the support 4. The jaws 16 are opened, a length of flexible tube T is positioned between the jaws and the jaws are closed to securely hold the tube but not to crush the same. The tube T is positioned so that its end is just touching the end of spigot S, as shown in FIG. 4. In practice the best way of achieving this contact is for an operator to push the end of the spigot into the end of the tube. This initial connection can be achieved easily, in contrast to the full connection over the barbed spigot. The tube and spigot combination can then be fitted onto the apparatus. The lever 8 is then moved to advance the spigot into the flexible tube. As the spigot advances, the pressure of the advance moves the jaws 16 very slightly towards the supports 26, increasing the distance therebetween to allow the spigot to be inserted into the tube. As can be seen in FIG. 5, the jaws are slightly further apart than in FIG. 4 to allow for the insertion of the spigot. However, the jaws still maintain a holding force on the tube preventing any significant backwards movement of the same away from the spigot. Once the spigot has been inserted to the correct depth, the lever 8 can be released. This draws the support 4 away from the jaws 16, leaving the spigot in the tube, in the jaws. The lever 30 can then be used to open the jaws and remove the spigot S now fitted to the tube T.

Figure 6:
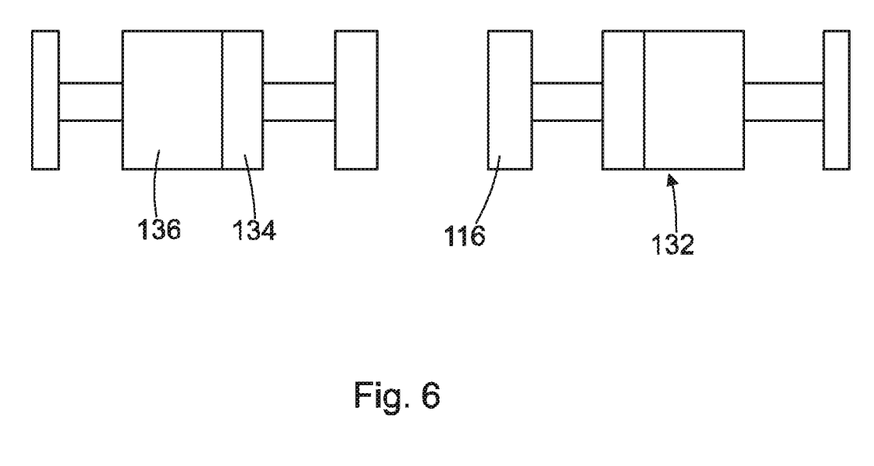
FIG. 6 is a front view of the jaws of a tube applicator according to a second aspect of the invention.

Turning now to FIG. 6, the embodiment thereshown is essentially identical to that shown in FIG. 1, with the exception that the movement of the jaws 116 is controlled by pneumatic cylinders 132. The jaws 116 are mounted between two pairs of cylinders, 134, 136 that control their movement. The first pair of cylinders, 134 act in the same way as the cam in the first embodiment, i.e. to move the jaws from an open position in which the flexible tube can be inserted and removed, and a closed position in which the flexible tube is griped securely but not crushed. The second pair 136 of cylinders acts in the same way as the springs in the first embodiment, namely to allow a small degree of opening of the jaws to accommodate the spigot as inserted into the tube, by means of check valves. The movement is controlled by a microprocessor (not shown). Alternatively, a single pair of cylinders can act both for the movement of the jaws between an open and closed position, and to allow a slight opening in the jaws to accommodate the entry of the spigot into the tube.

Figure 7:
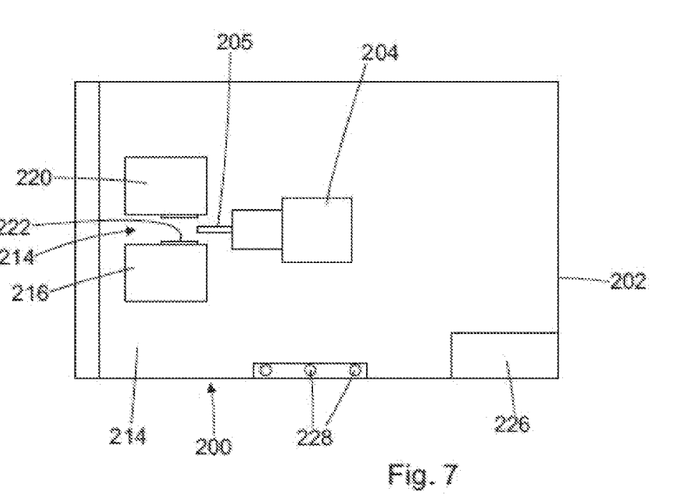
FIG. 7 is a top view of the apparatus according to a third embodiment of the invention.
Figure 8:
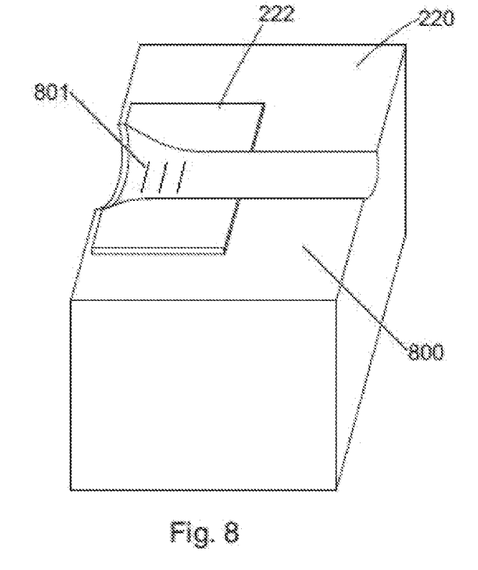
FIG. 8 is a perspective view of one of a pair of jaws from the embodiment of FIG. 7
Figure 9:
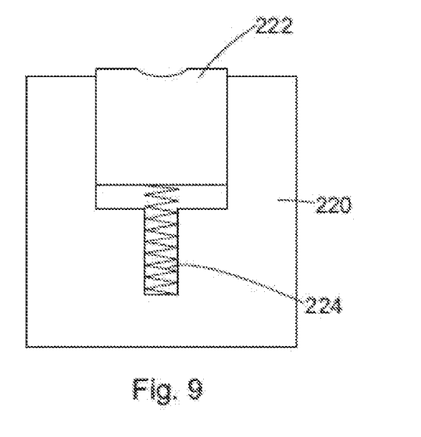
FIG. 9 is a sectional view of the jaw of FIG. 8.

Referring now to FIGS. 7 to 9, which show apparatus for inserting a spigot into a tube according to a third aspect of the invention. Similarly to the previous embodiments, the apparatus 200 includes a base 202 for supporting the apparatus. Provided on the base is a support 204 for holding a connector having a spigot S. The support 204 is readily changeable on the apparatus and each support will be designed to securely hold a different type or size of connector. As shown the connector is a flanged connector, but may also be a T- or Y-connector, and adapter, or any other device to which flexible tube is connected, including for example a filter. The support 204 shown is designed for use with a flanged connector and is provided with an elongated nose 205. The nose 205 is sized for entry into the flexible tube, to act as a guide to ensure that the spigot S is correctly inserted into the tube T. This removes the necessity of pre-connection of the end of the spigot S into the flexible tube T before operation of device to force the spigot fully into the tube, as described in reference to the first embodiment. The support 204 is mounted on the base for movement under piston control (not shown).

Also provided on the base, again similar to the previous embodiment, is a grip 214 for a flexible tube T. The grip includes a pair of jaws 216, which are mounted for movement under piston control.

The jaws 216 comprise a main element 220 and a compressible, movable front part (also referred to as front section, 222. The front section 222 fits into the main element 220 with a spring 224 positioned between the two, enabling movement of the front section relative to the main section. The front section is movable and is shown in FIGS. 7-9 in a free position extending inwards of the main element 220 into a spacing between the pair of jaws when the jaws are opened and do not have a tube retained therein. Both sections are provided with an indentation to accommodate the flexible tube T, with the front section having a flared portion at the front to accommodate the barb of the spigot. The whole of the jaw is easily replaceable to accommodate different sizes of tube and spigot, with the front section being further replaceable to accommodate the profile of the spigot. The front section 222 will generally be very slightly longer than the spigot to be inserted into the tube and profiled accordingly. The jaws and particularly the indented sections will be provided with small ridges 801 and/or indentations to increase the grip onto the tube.

Typically the jaws will be made out of plastics material such as a hard plastics material, however they could also be made out of metal, wood or any other suitable material. However, the compressive section 222 of the jaws will generally be made out of a metal, for example stainless steel. This is because it has been found that the slight movement of the tube within the jaws, on insertion of the spigot, has a tendency to polish the jaws, which can lead to a reduction or even loss of grip and less satisfactory working of the device. As metal is generally harder than plastics material, it is more resistant to the polishing. For devices that will experience a heavy use, it has been found that metal jaws are significantly more durable that plastics jaws. It has also been found that polishing is experienced on the compressible jaw only as this is where movement occurs. Thus the fixed jaw will typically be made of plastics material.

The jaws are designed to be easily replaceable, with the jaws 216 comprising contoured projections, which mate with contoured indentations in the grips 214. Thus the jaws can be replaced to suit different contours spigot, and different sized of flexible tube and spigot.

The base also holds a microprocessor 226 for controlling the movement of both the jaws 116 and the connector support 204. Buttons 228 will be provided connected to the microprocessor for controlling movement of these elements.

Figure 10:
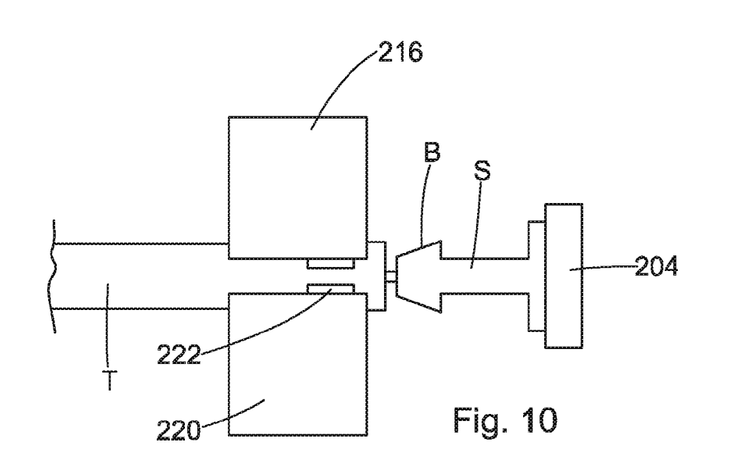
FIG. 10 is a top view of the apparatus of FIG. 7 with a spigot positioned on the support and a tube positioned between the jaws.
Figure 11:
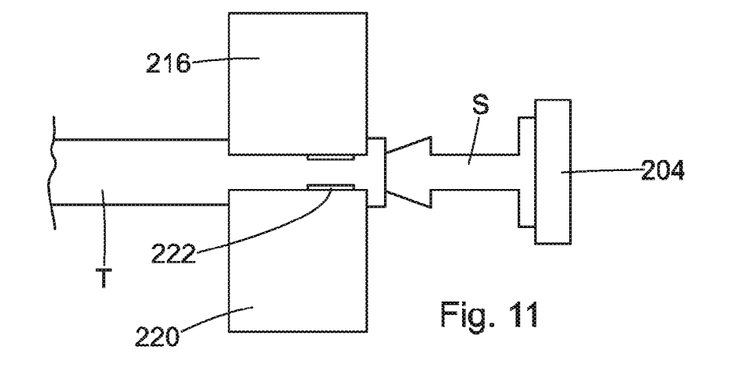
FIG. 11 is a top view of the apparatus of FIG. 7 with the spigot advanced slightly with respect to FIG. 10.
Figure 12:
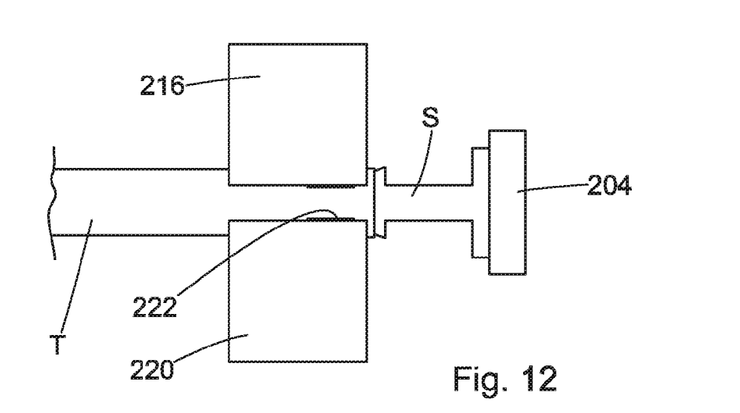
FIG. 12 is a top view of the apparatus of FIG. 7 with the spigot advanced further with respect to FIG. 11.

Referring now to FIG. 10-12, in use, initially the support 204 is retracted and jaws 216 are opened. A spigot S is positioned on the support 204 and a flexible tube of the corresponding size is placed between the jaws, which are then closed. In this position, the nose 205 of the support is just inside the end of the flexible tube T, as shown in FIG. 10. The support then advances, with the nose 205 of the support extending inside the tube T and guiding the spigot therein. FIG. 11 shows the spigot just starting to enter the tube. As the spigot is forced into the tube T, the front section 222 of the jaws 216 retracts into the main section of the jaws 220, to allow for the increasing width of the spigot. The main element of the jaws 220 holding firmly to the tube. FIG. 12 shows the spigot a significant way into the tube, with the movable front section 222 of the jaws retracted to allow for the entry of the barb. Once the spigot has been pushed into the tube, the jaws are opened and the spigot and tube removed. Specifically, FIGS. 10 and 11 show an embodiment of the movable front part 222 in a closed jaw position where the jaws are closed with the tube gripped therebetween. As the spigot S is advanced into the tube, the movable front part 222 moves to an outward position extending out of the spacing between the main jaw elements and into its main jaw element, such that under the force of the advancing spigot, at least part of one or both jaws can release sufficiently to allow the spigot to pass into the tube, while retaining the tube in the apparatus.

As can be seen by reference to FIGS. 7-12, the movable front part 222 being capable of movement between a number of positions. The jaws 216 are contoured to receive the tube in alignment with the spigot. Each jaw 216 comprises a main jaw element 220 arranged such that a contour is facing a contour of the other main jaw element 220, and a movable front part 222 movably mounted against a resistance on the main jaw element 220 at an end of the jaws 216. The movable front part 222 is capable of different positions including being movable between a free position, a closed jaw position, and an outward position. In the free position, the movable front part 222 is extending from its main jaw element into a spacing between the pair of jaws 216 when the jaws 216 are opened, and no tube is retained between the jaws 216. An example of the free position of the movable front part 222 can be seen in FIGS. 7-9. In the closed jaw position, tube T is retained between the jaws 216. In this case, the movable front part 222 is retracted by the gripping of the tube T. An example of the closed jaw position can be seen in FIG. 10. In the outward position, the movable front part 222 is further retracted inward into its main jaw element 220 by the advancing spigot, and extends outwards from the spacing between the main jaw elements 220. The outwards position occurs upon insertion of the spigot into the tube when the tube T is retained in the jaws 216, and allows the tube T to be retained in place and at the same time allows the movable front portion 222 to adapt for an increase in diameter of the barb B of spigot S. An example of the outwards position can be seen in FIG. 12.

The invention is not intended to be restricted to the details of the above-described embodiment. For instance, any combination of pneumatic or other powered control can be used in combination with manual operation for the different elements of movement required in the device.

The invention claimed is:
1. An apparatus for inserting a spigot into a flexible tube, the apparatus including
  means for supporting and advancing a spigot and
  means for gripping a flexible tube, while the spigot is inserted therein, the means for gripping including:
    a pair of jaws movable together for gripping and releasing the tube, with sufficient strength to hold the tube but not crush the same, the jaws being contoured to receive the tube in alignment with the spigot and each jaw having:
      a main jaw element arranged such that a contour is facing a contour of the other main jaw element; and
      a movable front part movably mounted against a resistance on the main jaw element at an end of the jaws, the movable part being movable between:
        a free position extending from its main jaw element into a spacing between the pair of jaws when the jaws are opened;
        a closed jaw position aligned with the main jaw elements when the jaws are closed with the tube gripped therebetween; and
        an outward position retracting out from the spacing between the main jaw element and into its main jaw element upon insertion of the spigot into the tube when the tube is between the movable front jaw parts such that under the force of the advancing spigot at least one or both movable parts of the jaws can release sufficiently to allow the spigot to pass into the tube, while retaining the tube in the apparatus;

the movable front part of the jaws being tapered at their front edges facing the means for supporting and advancing the spigot, to ease insertion of the spigot.

2. The apparatus as claimed in claim 1, wherein the jaws are provided with fine grooves or ridges to aid grip on the flexible tube.

3. The apparatus as claimed in claim 1, wherein the jaws are contoured in accordance with the shape of the spigot.

4. The apparatus as claims in claim 1, wherein the jaws are mounted on runners.

5. The apparatus as claimed in claim 4, including a cam to open and close the jaws.

6. The apparatus as claimed in claim 1, wherein the resistance is a spring.

7. The apparatus as claimed in claim 4, wherein the movement of the jaws, both for positioning to hold the flexible tube, and against the resistance can be provided mechanically, electrically or pneumatically, the apparatus being operated manually or electronically.

8. The apparatus as claimed in claim 1, wherein the jaws are made of hard plastics material.

9. The apparatus as claimed in claim 1, wherein at least part of the jaws are made of a metal.

10. The apparatus as claimed in claim 1, wherein the whole apparatus is sterilizable.

11. The apparatus as claimed in claim 1, wherein the jaws are removable.

* * * * *